(12) United States Patent
Begeja et al.

(10) Patent No.: US 8,151,298 B2
(45) Date of Patent: Apr. 3, 2012

(54) METHOD AND SYSTEM FOR EMBEDDING INFORMATION INTO STREAMING MEDIA

(75) Inventors: Lee Begeja, Gillette, NJ (US); David Crawford Gibbon, Lincroft, NJ (US); Kenneth Mervin Huber, Red Bank, NJ (US); Zhu Liu, Marlboro, NJ (US); Robert Edward Markowitz, Glen Rock, NJ (US); Bernard S. Renger, New Providence, NJ (US); Behzad Shahraray, Freehold, NJ (US); Gary Lee Zamchick, Tenafly, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2143 days.

(21) Appl. No.: 10/163,091

(22) Filed: Jun. 6, 2002

(65) Prior Publication Data
US 2003/0030752 A1 Feb. 13, 2003

Related U.S. Application Data

(63) Continuation-in-part of application No. 10/034,679, filed on Dec. 28, 2001.

(60) Provisional application No. 60/282,204, filed on Apr. 6, 2001, provisional application No. 60/296,436, filed on Jun. 6, 2001.

(51) Int. Cl.
*H04N 5/445* (2011.01)
(52) U.S. Cl. ............... 725/38; 725/93; 725/94; 725/134
(58) Field of Classification Search .................... 725/86, 725/38, 93, 94, 134
See application file for complete search history.

(56) References Cited

U.S. PATENT DOCUMENTS

| | | | |
|---|---|---|---|
| 5,532,735 A * | 7/1996 | Blahut et al. ................... | 725/32 |
| 5,614,940 A | 3/1997 | Cobbley et al. | |
| 5,664,227 A | 9/1997 | Mauldin et al. | |
| 5,708,767 A | 1/1998 | Yeo et al. | |
| 5,710,591 A | 1/1998 | Bruno et al. | |
| 5,734,893 A | 3/1998 | Li et al. | |
| 5,805,763 A | 9/1998 | Lawler et al. | |
| 5,821,945 A | 10/1998 | Yeo et al. | |
| 5,835,087 A | 11/1998 | Herz et al. | |
| 5,835,667 A | 11/1998 | Wactlar et al. | |
| 5,864,366 A | 1/1999 | Yeo | |

(Continued)

FOREIGN PATENT DOCUMENTS

CA 2320568 3/2001

(Continued)

OTHER PUBLICATIONS

The Feedroom web page. Nov. 30, 2001 <http://www.feedroom.com>.*

(Continued)

*Primary Examiner* — Farzana Hossain

(57) ABSTRACT

A method and system for embedding information into streaming media is disclosed. In order to avoid a prolonged waiting period between the time a video stream is selected for viewing and the time it actually begins to play, information relevant to the content of the video stream is independently obtained and locally stored. This information may be advertising, text, games or any other media which may be of interest to the user. The information is embedded into the video or other media stream to be presented to the viewer and played immediately, so that the user avoids any wait time in viewing the selected stream that may occur due to bandwidth shortages or other system considerations.

10 Claims, 5 Drawing Sheets

U.S. PATENT DOCUMENTS

| | | | | |
|---|---|---|---|---|
| 5,874,986 | A | 2/1999 | Gibbon et al. | |
| 5,924,105 | A | 7/1999 | Punch, III et al. | |
| 5,996,007 | A * | 11/1999 | Klug et al. | 709/218 |
| 5,999,985 | A | 12/1999 | Sebestyen | |
| 6,006,257 | A * | 12/1999 | Slezak | 725/110 |
| 6,038,296 | A | 3/2000 | Brunson et al. | |
| 6,061,056 | A | 5/2000 | Menard et al. | |
| 6,092,107 | A | 7/2000 | Elefteriadis et al. | |
| 6,098,082 | A | 8/2000 | Gibbon et al. | |
| 6,166,735 | A | 12/2000 | Dom et al. | |
| 6,188,398 | B1 * | 2/2001 | Collins-Rector et al. | 725/37 |
| 6,229,524 | B1 * | 5/2001 | Chernock et al. | 345/157 |
| 6,233,389 | B1 | 5/2001 | Barton et al. | |
| 6,236,395 | B1 | 5/2001 | Sezan et al. | |
| 6,243,676 | B1 | 6/2001 | Witteman | |
| 6,282,549 | B1 | 8/2001 | Hoffert et al. | |
| 6,289,346 | B1 | 9/2001 | Milewski et al. | |
| 6,298,482 | B1 * | 10/2001 | Seidman et al. | 725/101 |
| 6,304,898 | B1 | 10/2001 | Shilgi | |
| 6,324,338 | B1 | 11/2001 | Wood et al. | |
| 6,324,512 | B1 | 11/2001 | Junqua et al. | |
| 6,338,094 | B1 * | 1/2002 | Scott et al. | 709/245 |
| 6,345,279 | B1 | 2/2002 | Li et al. | |
| 6,349,410 | B1 * | 2/2002 | Lortz | 725/110 |
| 6,353,825 | B1 | 3/2002 | Ponte | |
| 6,363,380 | B1 | 3/2002 | Dimitrova | |
| 6,385,306 | B1 | 5/2002 | Baster, Jr. | |
| 6,385,619 | B1 | 5/2002 | Eichstaedt et al. | |
| 6,411,952 | B1 | 6/2002 | Bharat et al. | |
| 6,434,550 | B1 | 8/2002 | Warner et al. | |
| 6,453,355 | B1 | 9/2002 | Jones et al. | |
| 6,460,075 | B2 | 10/2002 | Krueger et al. | |
| 6,477,565 | B1 | 11/2002 | Daswani et al. | |
| 6,477,707 | B1 | 11/2002 | King et al. | |
| 6,496,857 | B1 * | 12/2002 | Dustin et al. | 709/219 |
| 6,507,941 | B1 | 1/2003 | Leung et al. | |
| 6,526,580 | B2 * | 2/2003 | Shimomura et al. | 725/63 |
| 6,564,263 | B1 | 5/2003 | Bergman et al. | |
| 6,604,239 | B1 * | 8/2003 | Kohen | 705/36 R |
| 6,671,715 | B1 | 12/2003 | Langseth et al. | |
| 6,678,890 | B1 * | 1/2004 | Cai | 725/24 |
| 6,698,020 | B1 * | 2/2004 | Zigmond et al. | 725/34 |
| 6,751,776 | B1 * | 6/2004 | Gong | 715/500.1 |
| 6,810,526 | B1 | 10/2004 | Menard et al. | |
| 6,956,573 | B1 | 10/2005 | Bergen et al. | |
| 6,961,954 | B1 | 11/2005 | Maybury et al. | |
| 6,970,915 | B1 | 11/2005 | Partovi et al. | |
| 7,000,242 | B1 * | 2/2006 | Haber | 725/43 |
| 7,130,790 | B1 | 10/2006 | Flanagan et al. | |
| 7,159,232 | B1 * | 1/2007 | Blackketter et al. | 725/38 |
| 7,178,107 | B2 | 2/2007 | Sezan et al. | |
| 2001/0013123 | A1 | 8/2001 | Freeman et al. | |
| 2001/0049826 | A1 | 12/2001 | Wilf | |
| 2002/0026638 | A1 * | 2/2002 | Eldering et al. | 725/42 |
| 2002/0052747 | A1 | 5/2002 | Sarukkai | |
| 2002/0056129 | A1 * | 5/2002 | Blackketter et al. | 725/112 |
| 2002/0087973 | A1 * | 7/2002 | Hamilton et al. | 725/32 |
| 2002/0093591 | A1 | 7/2002 | Gong et al. | |
| 2002/0100046 | A1 | 7/2002 | Dudkiewicz | |
| 2002/0138843 | A1 | 9/2002 | Samaan et al. | |
| 2002/0152464 | A1 | 10/2002 | Kitsukawa et al. | |
| 2002/0152477 | A1 | 10/2002 | Goodman et al. | |
| 2002/0173964 | A1 | 11/2002 | Reich | |
| 2003/0135853 | A1 * | 7/2003 | Goldman et al. | 725/34 |
| 2004/0040042 | A1 * | 2/2004 | Feinleib | 725/112 |
| 2004/0117831 | A1 | 6/2004 | Ellis et al. | |
| 2005/0028194 | A1 | 2/2005 | Elenbaas et al. | |
| 2005/0076357 | A1 * | 4/2005 | Fenne | 725/14 |
| 2005/0076378 | A1 | 4/2005 | Omoigui | |
| 2005/0193410 | A1 * | 9/2005 | Eldering | 725/34 |
| 2005/0223408 | A1 | 10/2005 | Langseth et al. | |
| 2005/0278741 | A1 | 12/2005 | Robarts et al. | |
| 2007/0079327 | A1 * | 4/2007 | Khoo et al. | 725/35 |

FOREIGN PATENT DOCUMENTS

| | | |
|---|---|---|
| WO | WO 96/27840 | 9/1996 |
| WO | WO 98/07103 | 2/1998 |

OTHER PUBLICATIONS

Pseudo.com web page. Nov. 30, 2001 <http://www.pseudo.com>.*

Medium4.com web page. Nov. 30, 2001 <http://www.medium4.com>.*

Yahoo! Finance Vision web page. Nov. 30, 2001 <http://vision.yahoo.com>.*

Gibbon, D., "Generating Hypermedia Documents from Transcriptions of Television Programs Using Parallel Text Alignment", Handbook Internet Multi. Syst. Appl., CRC Press, 1998.

Huang, Q., et al., "Automated Generation of News Content Hierarchy by Integrating Audio, Video, and Text Information", Proc. IEEE ICASSP, 1999.

Shahraray, B., "Multimedia Information Retrieval Using Pictorial Transcripts", Handbook Multimedia Computing, CRC Press, 1999.

Shahraray, B., et al., "Multimedia Processing for Advanced Communication Services", Multimedia Communications, Springer-Vertag, 1999.

Shahraray, B., "Scene Change Detection & Content-Based Sampling of Video Sequences", Proc. SPIE 2419, 1995.

The FeedRoom web page—http://www.feedroom.com, 1 pg, (Nov. 30, 2001).

Pseudo web page—http://www. pseudo.com, 4 pgs (Nov. 30, 2001).

Medium4.com web page—http://www.medium4.com, 1 pg. (Nov. 30, 2001).

Yahoo finance vision web page—http://vision.yahoo.com. 3 pgs. (Nov. 30, 2001).

"Choosing Your Next Handheld", Handheld Computing Buyer's Guide (Fall 2001), Issue 3., http://www.hhcmag.com.

Raggett, D. "Getting Started with VoiceXML 2.0", http://www.w3.org/Voice/Guide/ (Sep. 17, 2002), pp. 1-4, 6-8, and 10.

Windows Media Player 7 Multimedia File Formats web page—http://support.microsoft.com/default.aspx?scid=/support/mediaplayer.wmptest/wmptest.asp., pp. 1-6, Dec. 23, 2002.

* cited by examiner

400

500

METHOD AND SYSTEM FOR EMBEDDING INFORMATION INTO STREAMING MEDIA

This application is a continuation-in-part of nonprovisional application Ser. No. 10/034,679, which was filed on Dec. 28, 2001, and claims priority to provisional application 60/282,204, which was filed Apr. 6, 2001, and to provisional application 60/296,436, which was filed Jun. 6, 2001, which are hereby incorporated by reference in their entireties.

BACKGROUND OF THE INVENTION

1. Field of the Invention

The present invention relates to the delivery of multimedia assets to a user. More specifically, the present invention relates to a method and system for personalizing the manner in which the user selects and receives, via a network, stored multimedia assets.

2. Description of the Related Art

An ability to capture, store and transfer multimedia assets has recently grown in importance as businesses and consumers seek to take advantage of every aspect of their computers, televisions and associated networks. For example, where users were able to observe only the news brought to them by their local or national television news or newspapers, Internet users are now able to actively access information from any news source that has an Internet presence. Similarly, satellite television users are capable of receiving far more specialized channels than were available just a few years ago. Moreover, users who were used to merely reading about an event now wish to actually watch video footage of that event.

Unfortunately, the overabundance of information provided by the types and sources of information currently available can often be overwhelming to an individual, and that individual may become incapable of, or uninterested in, sorting through the information for items that he or she finds of interest. Therefore, what is needed is a service or ability to provide a user with only that information which the user will find of interest.

However, even once the user's interests have been identified, it can be difficult to locate and provide media associated with those interests. Particularly in the case of video segments, there is currently no suitable methodology for searching and delivering multimedia assets such that a user may obtain them in a personalized or customizable manner. For example, it is very difficult to apply traditional text-based searching techniques to the finding of a particular video segment from amongst a plurality of video segments. Some conventional services attempt to provide this ability; however, none currently does so in an acceptable manner.

For example, some services store multimedia assets such as video segments and simultaneously provide associated meta-tags for searching those assets. In this way, a particular news broadcast might be tagged as including certain content, such as content relating to the President of the United States. These conventional tagging services are limited in usefulness.

First, such conventional services are not always capable of accurately defining a portion of a video segment that will be of interest to a user, particularly when the meta-tags are not sufficiently detailed. In this example, a news broadcast may be tagged as including content relevant to the President; however, when the user requests that news broadcast, he or she may find that the tagged content deals with the President's tax agenda, whereas the user was seeking information on education reform.

Secondly, even when a broadcast is correctly identified as containing information sought by the user, the user may still be forced to sift through a fairly large amount of information to find the information sought. In the above example, even if a half-hour news broadcast was correctly tagged as containing information about the President's education reform agenda, the user may still have to view or skim virtually the entire broadcast to find that desired clip or segment of information.

Furthermore, even to the extent that conventional services can locate a desired multimedia asset, they are often incapable of both doing the search and thereafter delivering the asset to the user in a manner convenient to the user. That is, typically the user must perform the search himself, choose relevant results and then work to import the chosen assets.

Therefore, what is needed is a system and method for conveniently locating and delivering multimedia assets to a user such that the user receives only the assets (or portions thereof) that he or she desires, and such that the assets are received in an easy-to-use format.

SUMMARY OF THE INVENTION

In one exemplary embodiment, the present invention relates to a method and system for embedding information into streaming media. In order to avoid a prolonged waiting period between the time a video stream is selected for viewing and the time it actually begins to play, information relevant to the content of the video stream is independently obtained and locally stored. This information may be advertising, text, games or any other media which may be of interest to the user. The information is embedded into the video or other media stream to be presented to the viewer and played immediately, so that the user avoids any wait time in viewing the selected stream that may occur due to bandwidth shortages or other system considerations.

The features and advantages of the invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION

Figure 1:
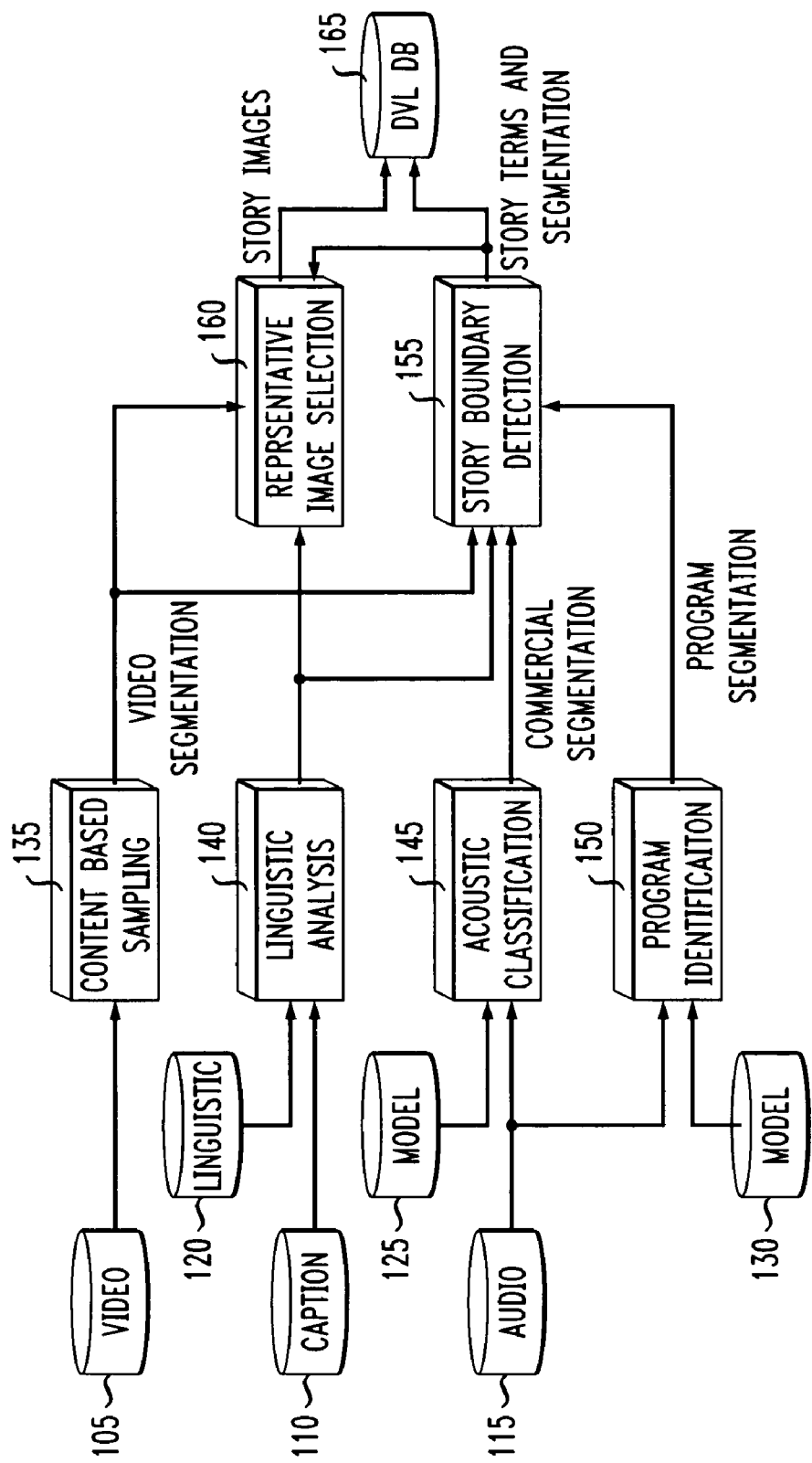
FIG. 1 demonstrates an exemplary methodology for media processing according to one embodiment of the invention.

While the present invention is described below with respect to various exemplary embodiments, the present invention is not limited to only those embodiments that are disclosed.

Other embodiments can be implemented by those skilled in the art without departing from the spirit and scope of the present invention.

The present invention solves the above-discussed problems and provides a personalized, customizable multimedia delivery service that is convenient and easy to use. In one embodiment of the invention, the service works by recording all of the video streams of appropriate source and interest to a target audience. For example, the service may record content from a collection of (or a particular one of) sports or news channels on television. In another example, the service may record content related to training videos, presentations or executive meetings in a business, school or other particularized environment. Recording may occur as the content is originally being broadcast (i.e., live), afterwards from recorded media, or even before the content is broadcast to its intended audience.

Once the content is captured and recorded, it can be segmented, analyzed and/or classified, and thereafter stored on a platform. For example, the content can be broken down into its component parts, such as video, audio and/or text. The text can include, for example, closed-captioning text associated with the original transmission, text generated from an audio portion by speech recognition software, or a transcription of the audio portion created before or after the transmission. In the latter case, it becomes possible to utilize the invention in conjunction with executive speeches, conferences, corporate training, business TV, advertising, and many other sources of video which do not typically have available an associated textual basis for searching the video.

Having obtained or generated the text, it can then be used as a basis for searching the multimedia content. In particular, the text provides the basis for an exemplary methodology for overcoming the above-identified problems associated with searching video in the prior art. That is, if a user wishes to search the stored content for video segments relevant to the President of the United States discussing a particular topic, then the President's name and the associated topic can be searched for within the text associated with the video segments. Whenever the President's name and the associated topic are located, an algorithm can be used to determine which portion of an entire video file actually pertains to the desired content and should therefore be extracted for delivery to the user. Thus, if a video file comprises an entire news broadcast about a number of subjects, the user will receive only those portions of the broadcast, if any, that pertain to the President and the particular topic desired. For example, this could include segments in which the President talks about the topic, or segments in which another talks about the topic and the President's position.

Once the pertinent segments of the broadcast have been appropriately extracted, for a given user, they can be stitched together for continuous delivery to that user. In this way, for example, the segments can be streamed to the user as a means of providing an easy-to-use delivery methodology for the user, and as a means of conserving bandwidth. Users can view the delivered multimedia asset in its entirety, skip between the assets, or view only portions of the assets, as they desire. Moreover, a user can have access to portions of the original video file that occurred immediately before or after the extracted segments; for example, the user could choose to watch the entire original video file. Such access can be granted by including a "more" or "complete" button in a user interface.

In one embodiment of the invention, a profile of the user is stored which specifies criteria for searching available multimedia assets. The criteria may include, for example, key words and/or phrases, a source(s) of the content, etc. The profile can be set directly by the user via interaction with an appropriately designed graphical user interface (GUI). When such a profile is available, the present invention is capable of automatically searching the available assets on a periodic basis, and thereafter extracting, combining and delivering the compiled assets (or segments thereof, regardless of their original source) to the user. In one embodiment, the invention can be utilized such that a service platform assisting in implementing the invention notifies the user whenever new multimedia assets consistent with the user's profile have been prepared. In another embodiment, the invention may automatically deliver multimedia assets in accordance with a user's profile according to a predetermined schedule, such as hourly or daily. Alternatively, the invention may notify the user of the presence of desired video clips, rather than actually deliver those clips.

The assets can be classified and indexed on-the-fly as they are received. In this way, the assets can be compared against the user's profile virtually in real-time, so that results can be provided to the user (and the user can be notified) whenever they become available. Furthermore, a user can provide criteria for a search or searches beyond those set in the user's profile.

The identified assets can be delivered to the user in a variety of manners. For example, delivery may occur via cable or satellite television, or directly to a personal computer. The present invention can be practiced via a plurality of platforms and networks. For example, the invention may be practiced over the Internet to reach a large consumer audience, or it may be practiced over an intranet to reach a highly targeted business or industry target.

In one embodiment, the present invention allows video streaming of identified video clips. Video streaming (i.e., allowing the viewing of a video clip as it is downloaded rather than only after it is downloaded, which speeds the viewing process and largely obviates the need for video storage at the user location) is a communications technique that is growing in popularity with the increasing availability of both video players (especially for use with personal computers) and bandwidth to the average consumer. However, no conventional service allows users to accurately and quickly find desired clips for playing, and do not provide a ready means for providers to profit from the video streams that are provided.

When streaming the identified video clips, users may receive only those video clips identified by a search executed on the user's behalf. However, if a user desires, he or she may also choose to view an entire program from which the clip(s) was extracted. A user may also be allowed to choose some or all of the video clips for long-term storage, whereby the clip(s) can be archived for later use. In one embodiment, the user may store the clips at a local computer, and thereafter make the clips available to other users connected via a peer-to-peer network.

In another embodiment, the present invention allows improved video-on-demand (VOD). VOD is typically defined in the cable/satellite television arena as the ability to request programming at any time and to have VCR-like controls over the content being streamed to the TV. The present invention adds value to conventional VOD by allowing the user to demand video more accurately and completely.

An extension to VOD is personal video recorder (PVR) technology, which allows even more control over TV programs being viewed. Current PVR implementations are offered by TiVo and ReplayTV, and allow users great flexibility in storing programs for later viewing and/or manipulation in viewing (e.g., skipping over commercials in a television program). The present invention provides a searching tool for allowing users to find interesting programs, even from a variety of channel sources, to thereafter be recorded and viewed using PVR technology.

Moreover, whereas conventional PVR records only entire programs based on a user's directions, the present invention permits the recording of only those portions of programs that the user desires. In this regard, the present invention contemplates recording the desired portions either by doing so directly from the program, or by recording the entire program locally and then utilizing only those portions of the program desired by the user.

Having described various exemplary embodiments of the invention, it should be noted that the terms "video file," "video input," "video," "video program" or any similar term refers generically to any analog or digital video information, including any content associated therewith, such as multimedia content, closed-captioning text, etc. The terms "clip," "video clip," "electronic clip" or "eClip" should be understood to refer to any subsection of a video program that is selected based on a user search criterion. Also, the terms "extracting," "parsing," "removing," "accessing" or any similar term with respect to a video file refers to the use of a selected portion of the video file. Such use may include literal removal (permanent or temporary) from the context of a larger file, copying of the selected portion for external use, or any other method for utilizing the selected portion.

Based on the above-described features of the invention, a user may accurately, completely and promptly receive multimedia assets that he or she finds interesting, and may conveniently exploit the received assets in a manner best-suited to that user.

FIG. 1 demonstrates an exemplary methodology for media processing in a digital video library (DVL) according to one embodiment of the invention. Such media processing is used in implementing the present invention at a user level, by capturing, segmenting and classifying multimedia assets for later use and manipulation. It should be noted that the media processing implementation of FIG. 1 and discussion of associated concepts are provided in greater detail in the following documents, which are hereby incorporated herein by reference: Shahraray B., "Scene Change Detection and Content-Based Sampling of Video Sequences," Proc. SPIE 2419, *Digital Video Compression: Algorithms and Technologies*, pp. 2-13, February 1995; Shahraray B., Cox R., Haskell B., LeCun Y., Rabiner L., "Multimedia Processing for Advanced Communications Services", in *Multimedia Communications*, F. De Natale and S. Pupolin Editors, pp. 510-523, Springer-Verlag, 1999; Gibbon D., "Generating Hypermedia Documents from Transcriptions of Television Programs Using Parallel Text Alignment," in *Handbook of Internet and Multimedia Systems and Applications*, Borko Furht Editor, CRC Press 1998; Shahraray B. "Multimedia Information Retrieval Using Pictorial Transcripts," in *Handbook of Multimedia Computing*, Borko Furht Editor, CRC Press 1998; and Huang Q., Liu Z., Rosenberg A., Gibbon D., Shahraray B., "Automated Generation of News Content Hierarchy By Integrating Audio, Video, and Text Information," Proc. IEEE International Conference On Acoustics, Speech, and Signal Processing ICASSP'99, pp. 3025-3028, Phoenix; Arizona, May 1999.

In FIG. 1, multimedia assets including video 105, associated text captions 110 and corresponding audio portions 115 are imported into the system for processing. Content-based sampling engine 135 receives the video and segments it into individual shots or video frames; this information will be combined with information extracted from the other components of the video program to enable the extraction of individual stories (i.e., video segments related to a particular topic or topics), as will be described. Additionally, this process allows a representative image for a particular story, segment or clip to be selected by engine 160; and second, the process allows boundaries around the story, segment or clip to be set by engine 155.

A database 120 of linguistic rules is used by linguistic analysis engine 140 to combine the caption information 110 with the segmented video within engines 155 and 160, to thereby assist in the functionality of those two engines. Similarly, information within model databases 125 and 130 is used by acoustic classification engine 145 and program identification engine 150 to provide segmentation/identification of commercials and programs, respectively. Once the multimedia asset(s) have been captured, segmented and classified as described above, they can be stored thereafter in DVL database 165.

All of the information from engines 135-150 is utilized in engines 155 and 160 to discern a length of a particular video story or clip that will be associated with each topic. In particular, for example, multimodal story segmentation algorithms such as those described in "Automated Generation of News Content Hierarchy By Integrating Audio, Video, and Text Information" (above) can be used to determine an appropriate length of a video clip to be associated with a particular topic. Similarly, the algorithm can be used in conjunction with the user profile to either compare the profile information to newly-acquired content on-the-fly, or to similarly determine an appropriate length for a video clip to be associated with a particular portion of the user profile.

As referred to above, textual information used to identify clips of interest can be derived, for example, from closed-captioned text that accompanies most television programs. Real-time closed captioning typically lags behind the audio and video by a variable amount of time from about 1 to 10 seconds. To take this factor into account, the embodiment of FIG. 1 is capable of using speech processing to generate very accurate word timestamps.

When closed-captioned text is not available, a large vocabulary automatic speech recognition system can be used to generate a transcript of the audio track. While the accuracy of the automatically generated transcripts is below that of closed captions, they provide a reasonable alternative for identifying clips of interest with reduced, but acceptable, accuracy. Alternatively, a parallel text alignment algorithm can be used to import high quality off-line transcripts of the program when they are or become available.

Figure 2:
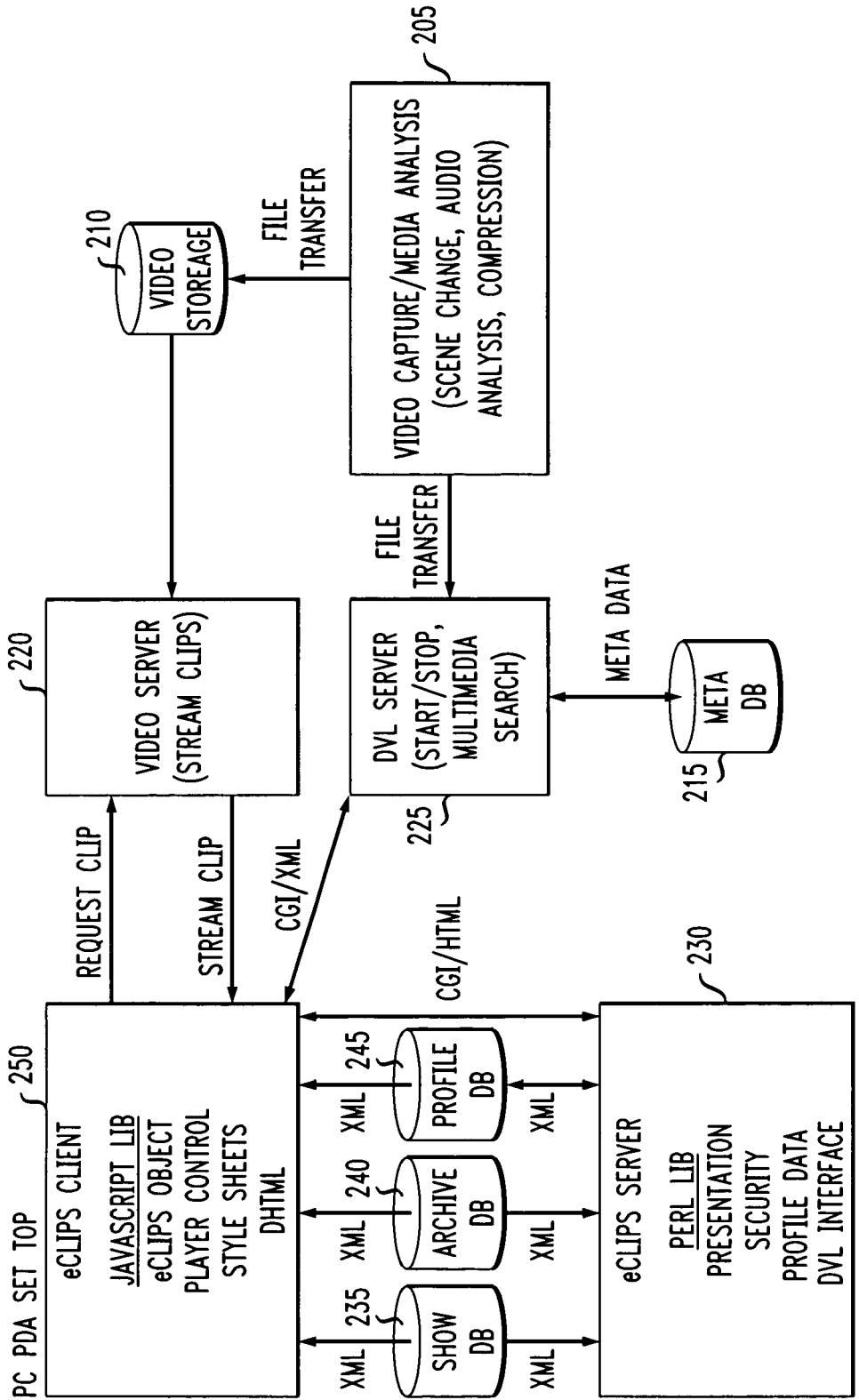
FIG. 2 implements an architecture for implementing an exemplary embodiment of the present invention.

FIG. 2 implements an architecture for implementing an exemplary embodiment of the present invention. It should be noted that the architectural elements discussed below can be deployed to a user and/or provider of multimedia assets in whole or in part, and therefore each element interfaces with one another and external components using standard, conventional interfaces.

In FIG. 2, Video Capture/Media Analysis component 205 records and compresses broadcast TV programming. Also at component 205, various functions can be performed on the content such as scene change detection, audio analysis, and compression. These video files are shipped to the Video Storage database 210 from which they will be served when the video is streamed to the client 250.

Associated metadata is shipped to the Metadata database 215. Note that thumbnail images are included as part of the metadata, as well as terms and/or phrases associated with a clip(s) for categorizing the clip(s) within a topical subset. Typically, this video capture/media analysis process need not occur in real time. However, there is no reason why it could not occur in real time if an operator so desires and wishes to devote sufficient computational resources. In any case, it is not necessary to wait until a show is completed before indexing and searching that show.

Video Server 220 responds to clip requests and makes the video content available to the client 250. For example, the video server 220 may download the video clips in whole or in part, stream the clips (e.g., via MPEG4 ASF or MPEG2) to the client 250 or generate the clip metadata discussed above (such as terms and/or phrases associated with a clip for categorizing the clip within a topical subset).

DVL Server 225 handles query requests (such as how many clips are available, which shows have clips, etc.) and/or clip content requests (metadata that describes clip content including "clip pointer" to video content). Thus, it handles multimedia search (such as closed captioning text) and determines the start and stop times of the clips, which are designated with "clip pointers," as just mentioned eClips server 230 handles client requests for web pages related to a service for providing eClips. eClips server 230 utilizes Perl Common Gateway Interface (CGI) scripts that the client navigates in order to perform the functions of the eClips service. For example, the scripts deal with login/registration related pages, home page, profile related pages, archive related pages, player pages, and administration related pages. Player scripts can be launched in a separate window. Each CGI request from the client 250 will return HTML with HTML DIVs, JavaScript, and CSS style sheets. The DIVs and CSS style sheets are used to position the various elements of the page. DHTML is used to dynamically load DIV content on the fly (for instance, a list of shows in an instant search pulldown performed by a user).

In FIG. 2, three databases 235, 240 and 245 are shown as Extensible Markup Language (XML) databases. Thus, Perl scripts can be utilized to access (i.e., read from and/or write to) these databases via XML. Specifically, these three databases include show database 235, which contains information about recorded broadcasts, Profile database 245, which contains personal search terms and/or phrases, and Archive database 240, which contains saved clip information (e.g., entire clips or simply clip pointers).

eClips Client 250, in one embodiment, includes a JavaScript that each Perl script includes in the HTML that is returned from the eClips server 230. It is through the JavaScript that the client 250 interacts with the DVL server to determine the desired content and through JavaScript that the client initiates the streaming content with the video server 220. The JavaScript also accesses (reads) the Show and Profile XML files in those databases.

The Video Server 220 may have a separate IP host name, and should support HTTP streaming. The DVL and eClips servers may have the same IP host name, and may be colocated within a single machine.

In FIG. 2, the key interactions that cause video to be streamed to the client 250 are demonstrated. In a home page view, a user has logged in already and should see a list of topics determined by their profile, as well as the number of clips for each topic. An example of a topic could be "sports" and the keyword string associated with this topic could be football, baseball, hockey. The keyword string is used to search the CC text (in this case, clips that have any of these terms will be valid).

When the home page is loaded, JavaScript will send a CGI query to DVL server 225, which generates an XML response. The XML is parsed into JavaScript variables on the client using the XML document object model (DOM). The CGI query and XML response is implemented as part of the DVL system and acts as a layer above an Index Server, which, as part of the DVL server 225, performs text indexing of the video clips (as discussed above) that allows the user to locate a desired clip. The XML response will include the number of clips found for each topic. It is with these query responses that the home page knows which topics have hits and can activate the links to play the content.

These JavaScript links, when clicked, can launch the player page in a separate window. When the player page is loaded, essentially the same JavaScript can be used to recalculate the number of clips for each topic. In principle, this could be changed to calculate this only once and to pass this on to the player script thereafter. The JavaScript may also run a query to get the list of shows with clips for a particular topic. The JavaScript then loops through all the shows with hits and queries the DVL server via the separate CGI script to get the clip information needed to play the clip. This information is also returned via XML and parsed via the JavaScript. The JavaScript loads various DIVs that depend on this information, such as hit search term found in CC text, CC text, and thumbnail. Finally, the player page JavaScript starts the media player with the first clip using a pointer (start time) to the video. It should be noted that, in one embodiment of the invention, the just-described process is almost completely automated, so that dynamic clip extraction occurs when a clip is selected, and a show automatically starts and will play completely through if not interrupted by the user.

In the architecture shown in FIG. 2, eClips client 250 may reside on, for example, a user's home or business computer, a personal digital assistant (PDA), or a set-top box on a user's television set. Client 250 interacts with eClips server 230 as discussed above to provide the user with an interface for viewing and utilizing the video clips. Client 250 can be written to contain, for example, a JavaScript object that contains profile results (eClips object). A user using eClips client 250 running on a PC may accesses stored clips through a network, such as the Internet or a locally-defined intranet.

In one embodiment, the user defines a search criterion, either through an "instant search" feature or within a user profile. When multiple clips are found matching the user search, the clips can be stitched together and streamed to the user as one continuous program. In another embodiment, eClips server periodically searches for clips matching a given user's profile, and makes the clips available to the user, perhaps by notifying the user via email of the availability of the clips.

The architecture shown in FIG. 2 allows for video to be stored and displayed in several formats including MPEG2 (e.g., for digital television and video on demand) and MPEG4 (e.g., for streaming video on the Internet). As mentioned above, the video may be stored for later use by the user; in particular, a user may archive some or all of the received video and thereafter permit searching and uploading of the video from storage by other members of a peer-to-peer computer network.

Figure 3:
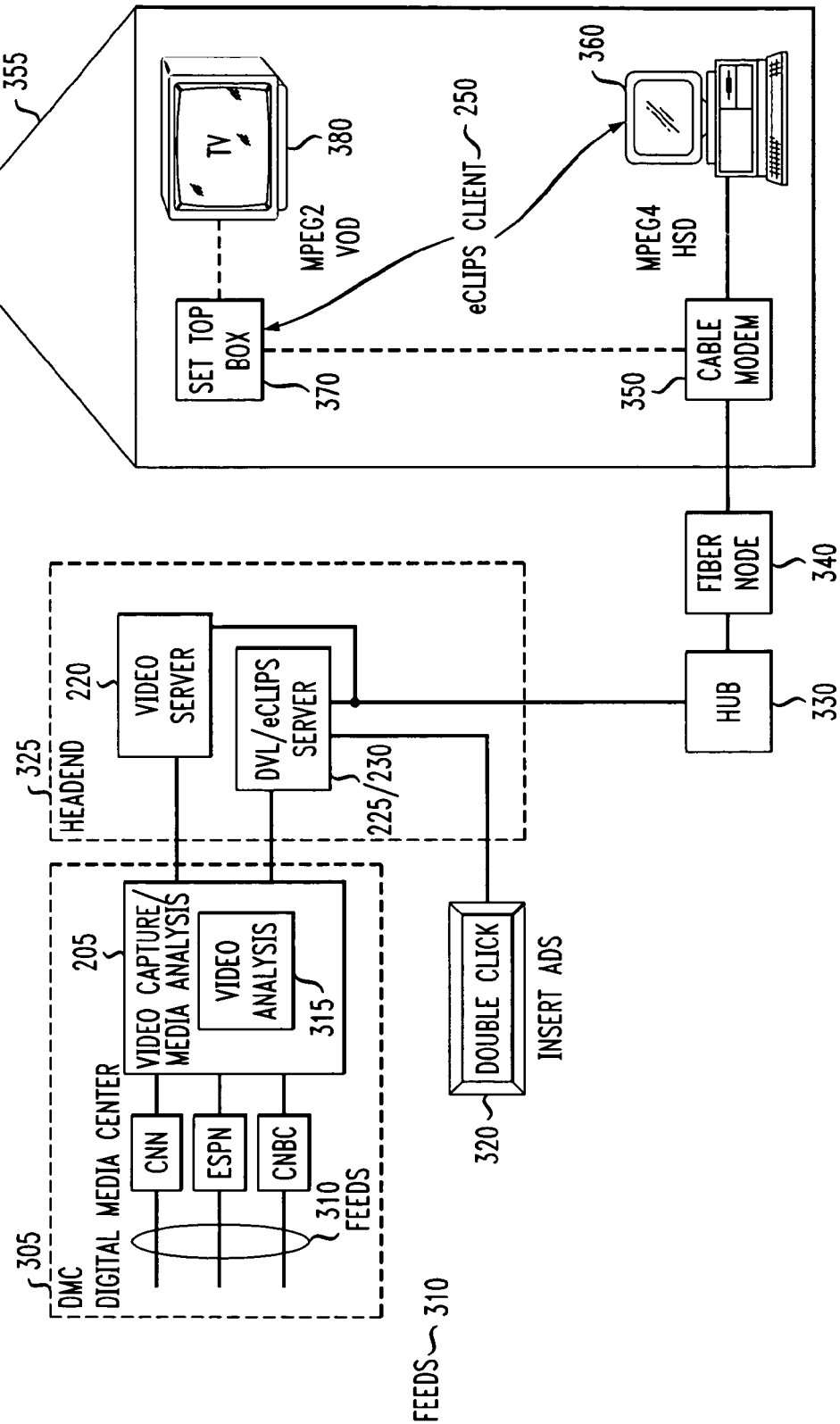
FIG. 3 demonstrates a more specific hardware architecture according to another exemplary embodiment of the present invention.

FIG. 3 demonstrates a more specific hardware architecture according to another exemplary embodiment of the present invention. In FIG. 3, video feeds 310 are received through various sources (such as television channels CNN, ESPN and CNBC) at Video Capture/Media Analysis componenet 205 within a cable service digital media center 305. Component 205 receives the feeds and forwards captured/analyzed results to video server 220 and/or DVL/eClips server 225/230 within cable Headend 325. In FIG. 3, video analysis portion 315 is illustrated within component 205, although it should be understood from FIG. 2 and the associated discussion above that component 205 may perform other media analysis such as audio analysis. The DVL/eClips seivers 225/230 operate as described above in conjunction with FIG. 2 to deliver, using, for example, Hybrid Fiber Coas (HFC) connections, all or part of the video feeds to routing hub 330, and then through fiber node 340 to cable modem 350 located within user home 355. Additional marketing and advertising (such as a commercial placed between every third clip stitched together) could be tied into the video stream in one embodiment of the present invention at the Headend from providers 320 such as DoubleClick.

Within user home 355 the feed is received at cable modem 350 via high speed data line (HSD) to a PC 360 running eClips client 250. Alternatively, the feed could be sent to Settop box 370 atop TV 380, where Settop box 370 runs eClips client 250. In the example where the video clips are received via cable modem 350, the service can be streamed as high speed data (HSD) through a cable modem as MPEG4 video. When the video is received via Seftop box 370, it can be delivered as MPEG2 over video on demand (VOD) channels that could be set up in advance for a service providing the present invention.

Figure 4:
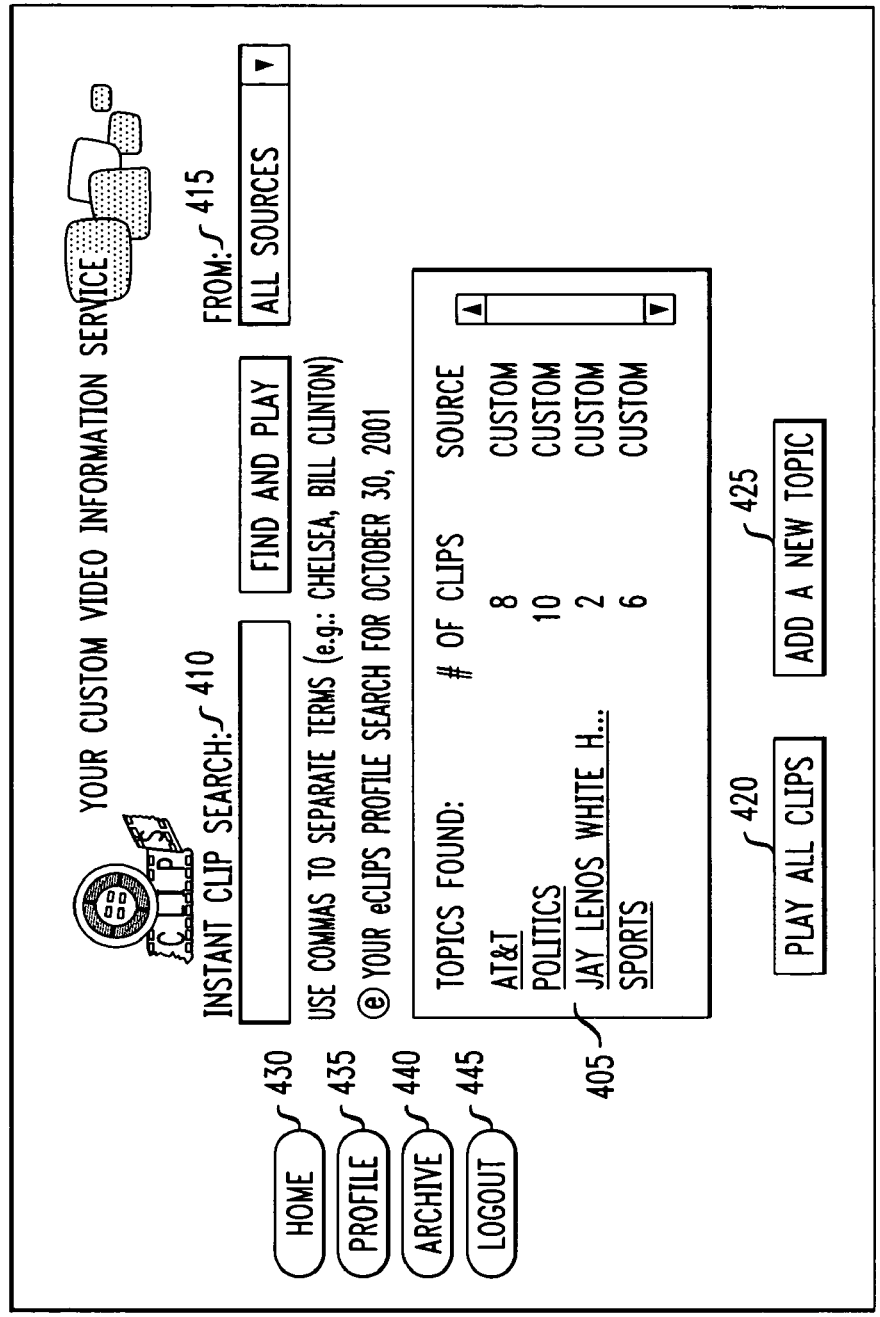
FIG. 4 is an exemplary page view of a page viewed by a user utilizing a client according to one embodiment of the invention.

FIG. 4 is an exemplary page view of a page viewed by a user utilizing an eClips client according to one embodiment of the invention. In FIG. 4, for example, the user might see page view 400 just after logging in to a system implementing the present invention. In page view 400, section 405 demonstrates the results of a profile search performed for the user on a given day, or over some other pre-defined period, according to the previously stored profile of that user. In section 405, clips are listed both by topic and by number of clips related to that topic. In section 405, the user therefore has the option of viewing one or more of the clips related to a particular topic.

Section 405 also identifies a source for the criteria used to select the various topical clips. More specifically, on a profile page, a user can select default sources (shows) which will be searched based on the user's profile; this is referred to as a "Main" list, and would restrict any profile topic that has the Main option to search only those shows selected on the profile page. On a topic editor page, where a user is allowed to add or modify topics for searching, the user can specify this Main list, or can make Custom selections that are only valid for a particular search topic. In section 405, the user has selected the latter option, and so a "source" is shown as Custom.

In section 410, the user additionally has the option of entering new search terms and/or phrases not related to his or her current profile, whereby the present invention searches a clips database via DVL server as described above with respect to FIG. 2. Section 415 indicates the media sources which will be searched for the terms or phrases entered in section 410.

Also, in page view 400, button 420, "Play all clips," allows a user to view all currently available clips with one click. The user can add a new topic using button 425. The user can return to a home page by clicking on button 430 (although this option is only valid when the user is on a page different from the home page 400 itself), access his profile via button 435 and access an archive of previously saved clips via button 440. Finally, a user can log out of the service using button 445.

Figure 5:
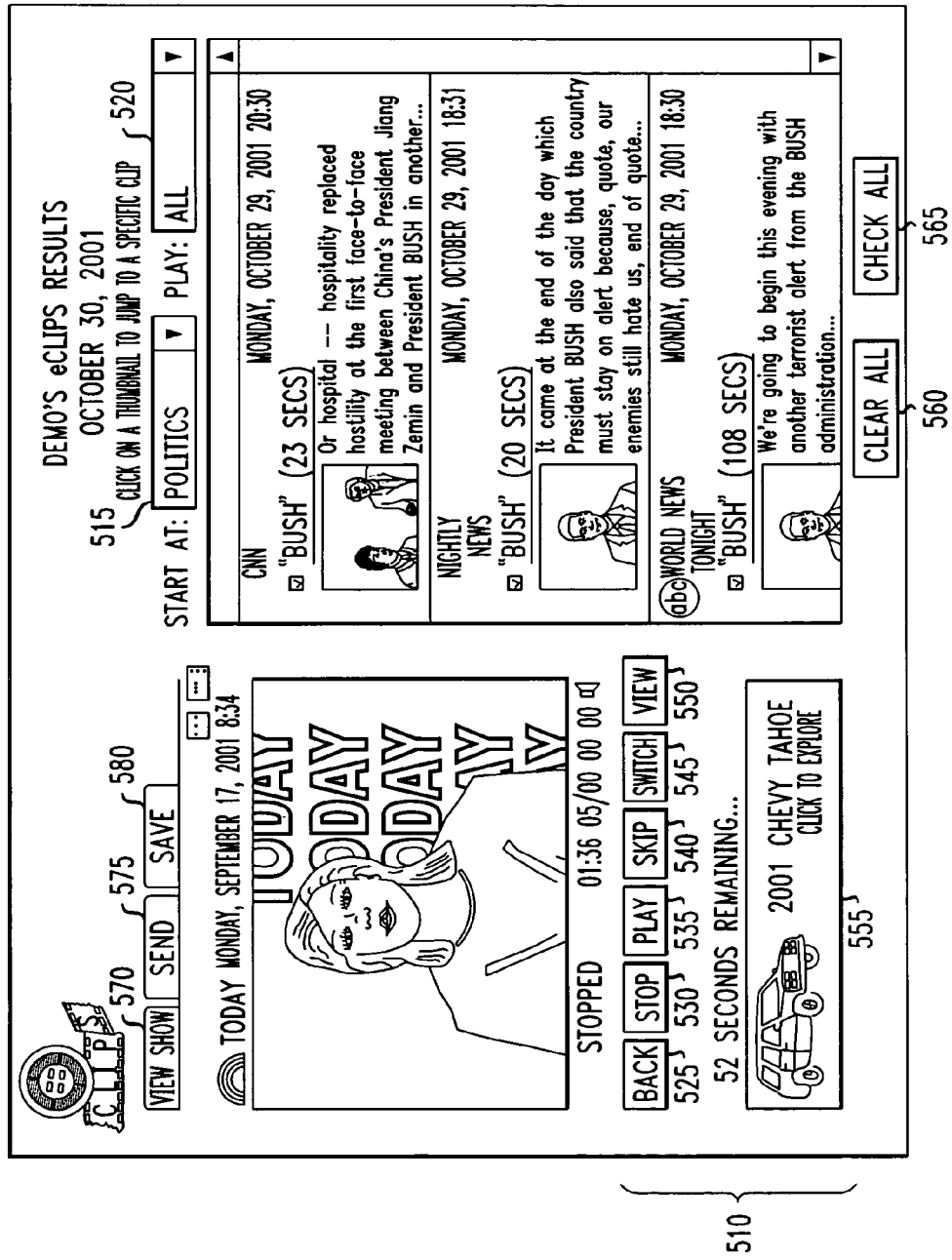
FIG. 5 demonstrates a page view showing a content retrieval page according to the exemplary embodiment shown in FIG. 4.

FIG. 5 demonstrates a page view 500 showing a content retrieval page according to the exemplary embodiment shown in FIG. 4. In section 505, still frames of the beginning of each clip (i.e., thumbnails) within a topic can be viewed by the user. Section 505 can be controlled by section 515, which allows the user to select a topic of clips to be shown, as well as section 520, which allows a user to select a portion of the clips from that topic that will be played. With buttons 560 and 565, a user may clear or select all of the clips being shown within a particular topic.

When one or more of these clips is chosen for viewing by the user, that clip is shown in section 510. Section 510 can be controlled by buttons 525-550, which allow a user to skip to a previous clip with button 525, stop the clip with button 530, play the clip with button 535, skip the clip with button 540, switch to a new topic of clips with button 545 or view footage after the selected clip(s) with button 550. Note that section 510 may also include advertisements 555, and may display a time remaining for a currently playing clip, a source of the clip, and a date and time the clip was originally broadcast.

In one exemplary embodiment of the invention, page 500 will play all of the clips currently available in a predetermined order (e.g., reverse chronological order, by source of content, etc.) if the user does not choose a specific topic or clip. Button 570 is activated when a user wants to view the clip(s) available; i.e., as shown in view 500. Button 575 allows the user to send (e.g., email) the clip(s) to another user, and button 580 allows the user to save the clip(s) to an archive (i.e., the archive accessed by button 440 in FIG. 4).

Having discussed various exemplary embodiments of the invention and associated features thereof, as well as potential uses of the present invention, the following provides a more detailed summary of application categories in which the present invention is of use.

Generally speaking, because the present invention can capture content from nearly any multimedia source and then use standard streaming media to deliver the appropriate associated clips, it is nearly limitless in the markets and industries that it can support.

As a practical matter, the present invention can be packaged to address different market segments. Therefore, it should be assumed that the target markets and applications supported could fall into, for example, any or all of the Consumer, Business-to-Consumer or Business-to-Business Marketplaces. The following discussion summarizes some exemplary application categories.

First, as a consumer offering, the present invention can be provided as an extension to standard television programming. In this model, an ISP, Cable Programming Provider, Web Portal Provider, etc., may allow consumers to sign up for this service, or the set of features provided by the present invention can be provided as a premium subscription.

In the consumer service model, a consumer would enter a set of keywords and/or phrases in the profile. In addition, as part of the preferences selected in the profile the user may determine that only specific content sources should be monitored. As the user profile is created or changed it would be updated in the user profile database. As video content is captured in the system, the user profile database is matched against the closed captioning/text. As an example, a consumer may be interested in sports but only want to see the specific "play of the day." In this scenario, the consumer would enter the key words "play of the day" and then identify in the profile the specific content sources (channels or programs) that should be recorded/analyzed by the present invention. For example, the consumer could choose channels that play sports games or report on sports news. When the consumer returns from work that evening, a site or channel for accessing the present invention would be accessed. This consumer would then see all of the clips of programs that matched the keywords "play of the day," meaning that this consumer would see in one session all of the content and clips matching that set of words.

As another example, in a Business-to-Consumer offering, the present invention can be provided as an extension to standard television programming. In this case, both the programming and its sponsorship would be different from the consumer model above. For example, a corporate sponsor or numerous corporate sponsors may offer specific types of content, or may offer an assemblage of content overlaid with advertising sponsorship. The sponsorship would be evident in the advertising that would be embedded in the player or in the content, since the design of the present invention is modular in design and allows for customization.

In the Business-to-Consumer service model, a consumer would enter a set of keywords in the profile. As the user profile is created or changed it would be updated in the user profile database. Because this model and the content provided would be underwritten by corporate sponsorship, the content provided may be limited to a proprietary set of content. As an example, if CNN were the sponsor of the service, all of the content provided may be limited to CNN's own broadcasts. In addition, it may be very evident to the consumer that the service is brought to them by CNN in that the CNN logo may be embedded in the user interface, or may be embedded in the content itself.

Next, as a Business-to-Business offering, the present invention can be used in intra-company applications as well as extra-company applications. The applications supported include, as just a few examples: Business TV, Advertising, Executive Announcements, Financial News, Training, Competitive Information Services, Industry Conferences, etc. In essence, the present invention can be used as a tool to assist employees in retrieving and viewing specific portions of content on demand.

In this Business-to-Business service model, a user would enter a set of keywords in the profile that would be updated in the user profile database. In this case, the content captured will be dependent upon the business audience using the service.

In an intra-business application, the user may wish to combine sources from within the business and sources outside of the business. As an example a user may wish to see all clips dealing with the category "Virtual Private Networks." In this example, a business may have planned a new advertising campaign talking about "Virtual Private Networks" and have an advertisement available to its internal personnel. At the same time, there may be an internal training class that has been recorded and is available internally in which a section talks about "Virtual Private Networks." Again, this could be another content option captured by the present invention. Also, one of this company's competitors may have provided a talk at an industry conference the day before about their solution for the "Virtual Private Network" area. As with the other content options, this too could be captured and available as a content option through the present invention. Therefore, when our user begins a session using the present invention and looks under the term "Virtual Private Networks," there could be numerous clips available from multiple sources (internal and external) to provide this user with a complete multimedia view of "Virtual Private Networks".

As an extra-business tool, the present invention can provide businesses, their suppliers, their best customers, and all other members of communities of interests with specific targeted content clips that strengthen the relationships. These may include (but not be limited to) product details, new announcements, public relations messages, etc.

As further examples of applications of the present invention, the following represent industry applications which may benefit from use of the present invention.

In the financial industry, financial information can be available for both professionals and potential clients to receive late-breaking information on stocks, companies and the global markets. The information can be from a variety of sources such as Financial News Network, Bloomberg, CNN, etc. and allow users to identify key areas of interest and to continually be up to date.

In the advertising/announcements industry, advertisers would be able to target their ads to consumers based on peoples' preferences as expressed in their profiles. This is potentially a win/win situation because people would not be getting any more ads but they would be seeing more things that interest them. Advertisers could charge more for this targeted approach and thereby pay for any costs associated with the present invention.

Similarly, large companies run TV advertisements for a multitude of products, services, target markets, etc. These companies could benefit by housing these commercials on an on-line database that can be accessible to their marketing staff, the advertising agencies, and clients interested in seeing particular commercials that used specific words or product names. The present invention can then allow these commercials to be easily searched and accessed.

In the entertainment industry, the movie industry can use the present invention to easily scan through archives of old and new movie footage that can be digitized and stored in a central repository. Sports highlights can be made available for particular games or events. Networks could maintain a library of indexed TV shows (e.g., PBS) where users can search for a particular episode/topic.

In the travel industry, searches can be done on new information in the travel industry such as airlines, causes of delays, etc. In addition, the present invention can be used to provide key clips from specific resorts and other potential vacation destinations.

In the distance learning/education industry, a large variety of courses could be stored on-line. In many circumstances, a user may want to only see the salient points on a specific topic of interest. The present invention can then play a key role in providing support to the user for access and retrieval of the key needed information.

For conferences and trade events, the present invention can be an information dissemination tool for finding the latest information quickly when videos are captured of talks and demonstrations in key events.

One embodiment of the invention relates to current bandwidth shortages and limitations which sometimes limit the prompt and effective provisioning of streaming video and other media. For example, Internet users, particularly home Internet users, often do not have access to high-speed data rates such as those found in cable and/or fiber-optic transmissions. As a result, such users often experience a significant delay between the time a video stream is selected and the time the stream actually begins to play. This delay time may be additionally and/or further exacerbated by the need to buffer an initial portion of the video stream locally, so that the video stream will play smoothly once it does begin to play. These shortcomings of conventional streaming techniques may therefore also affect the provisioning of eClips servers according to the present invention, as has already been described.

In order to alleviate the need for a user of the eClips service or other media streaming service to wait in front of a blank screen while the media prepares to play, the present invention provides relevant information to the user during such a potential wait time, thereby providing entertainment, advertising or other services and reducing the apparent wait time until playing begins. For example, with respect to the eClips service described above, a user receiving a customized media presentation might have information relevant to the subject matter of the presentation automatically downloaded from a DVL/eClips server during an off-time (such as late at night). The relevant information can be determined based on, for example, a user profile set up as part of the eClips service and in a manner similar to that described above for formulating the customized media presentation itself. The information might also be information previously obtained and stored locally by the user for viewing which has simply not yet been viewed by the user. This way, the information can be made available on the user's local hard drive, and can therefore be played immediately upon selection of a particular media stream, during the time when the media stream is being delivered and/or buffered for viewing. While the information is being displayed, the viewer may choose to see the information in its entirety before viewing the particular video stream selected for viewing. In another embodiment, however, the user may discontinue viewing the local information as soon as the primary stream becomes available.

Relevant information that might be embedded into a media stream being delivered as just described might include, for example, information about the subject matter of the stream or information related thereto, such as advertising for related products or services. Additional possibilities for embedding into the media stream include graphics, games, text, pictures and other types of known media assets. The present invention might operate through the use of multiple media players, perhaps displaying only one instance of a particular video stream. For example, if the particular video stream is selected for viewing on a certain media player, the present invention might automatically (or optionally) open a second media player for playing the locally-stored information to be displayed prior to the playing of the primary video stream. Moreover, the present invention might display multiple pieces of relevant information, so that the user may choose what to view during the wait time for the primary stream. For example, a number of video thumbscreens or video shots might be displayed from which the user can choose for viewing. Software at the user's local system may be operable to set forth a criteria and/or timing according to which information to be embedded is located, stored and/or displayed. Alternatively, this functionality may be enabled at a server location, for example, using the DVL/eClips server discussed above.

In conclusion, a service for providing personalized multimedia assets such as electronic clips from video programs, based upon personal profiles, has been presented. In one embodiment, it uses text to ascertain the appropriate clips to extract and then assembles these clips into a single session. Thus, users only see the specific portions of videos that they desire. Therefore, users do not have to undertake the arduous task of manually finding desired video segments, and further don't have to manually select the specified videos one at a time. Rather, the present invention generates all of the desired content automatically.

In another embodiment, the present invention embeds locally-stored media into a video or other media stream to be presented to the viewer, so that the user avoids any wait time in viewing the selected stream that may occur due to bandwidth shortages or other system considerations. The locally-stored media may be relevant to the content of the primary stream, so that the user does not have to wait an undue amount of time to view information about a desired topic.

While this invention has been described in various explanatory embodiments, other embodiments and variations can be effected by a person of ordinary skill in the art without departing from the scope of the invention.

For example, although large multimedia files often must be delivered via broadband communication links, the fact that the present invention extracts exactly what the user is interested in makes it possible to deliver downloadable content to portable devices efficiently. The content can include video clips as discussed primarily above, or can be limited to still frames and text (or just text) if bandwidth/storage does not permit full motion video with audio. Hybrid schemes are also contemplated in which some of the content includes video, but other (e.g. perhaps older, or repeated similar stories from multiple sources) clips only include audio, or include only still images and/or text. In this regard, multimedia analysis techniques can be used to determine if stories are about the same topic, or contain the same video material. Because the present invention is capable of using standard access and delivery methods, it can be employed in virtually any home or industry application where delivery of multimedia assets is desired.

What is claimed is:

1. A method for displaying a primary video stream comprising primary content and displaying relevant information that is relevant to the primary content, wherein the primary video stream and the relevant information are automatically generated based on a user profile, the method comprising:
    receiving all of the relevant information;
    storing all of the received relevant information;
    receiving the primary video stream after all of the received relevant information has been stored;
    initiating buffering of the primary video stream while the primary video stream is being received;
    initiating displaying of the stored relevant information while the primary video stream is buffering;
    determining whether the primary video stream has completed buffering;
    upon determining that the primary video stream has not completed buffering, continuing the displaying of the stored relevant information; and
    upon determining that the primary video stream has completed buffering:
        in response to a first user command, continuing the displaying of the stored relevant information; and
        in response to a second user command, discontinuing the displaying of the stored relevant information and initiating displaying of the buffered primary video stream.

2. The method of claim 1, wherein the relevant information comprises an advertisement.

3. The method of claim 1, wherein the relevant information comprises entertainment.

4. The method of claim 3, wherein the entertainment comprises a game.

5. The method of claim 1, wherein the relevant information comprises a media stream previously designated by the user.

6. The method of claim 1, wherein the relevant information comprises audio information.

7. The method of claim 1, wherein the relevant information comprises a plurality of pieces of relevant information.

8. The method of claim 7, wherein displaying the relevant information comprises:
    displaying a representation of each of the plurality of pieces of relevant information;
    receiving a designation from the user for at least one of the plurality of pieces of relevant information; and
    displaying the at least one of the plurality of pieces of relevant information designated to the user.

9. The method of claim 8, wherein displaying a representation of each of the plurality of pieces of relevant information comprises displaying at least one of a video thumbscreen and a thumbnail image.

10. A non-transitory computer readable medium storing computer program instructions for displaying a primary video stream comprising primary content and displaying relevant information that is relevant to the primary content, wherein the primary video stream and the relevant information are automatically generated based on a user profile, the computer program instructions defining a method comprising:

receiving all of the relevant information;

storing all of the received relevant information;

receiving the primary video stream after all of the received relevant information has been stored;

initiating buffering of the primary video stream while the primary video stream is being received;

initiating displaying of the stored relevant information while the primary video stream is buffering;

determining whether the primary video stream has completed buffering;

upon determining that the primary video stream has not completed buffering, continuing the displaying of the stored relevant information; and upon determining that the primary video stream has completed buffering:

in response to a first user command, continuing the displaying of the stored relevant information; and in response to a second user command, discontinuing the displaying of the stored relevant information and initiating displaying of the buffered primary video stream.

* * * * *